United States Patent
Suri

(10) Patent No.: US 12,296,386 B2
(45) Date of Patent: May 13, 2025

(54) THREE-DIMENSIONAL PRINTING KITS

(71) Applicant: PERIDOT PRINT LLC, Palo Alto, CA (US)

(72) Inventor: Pavan Suri, Corvallis, OR (US)

(73) Assignee: Peridot Print LLC, Palo Alto, CA (US)

( * ) Notice: Subject to any disclaimer, the term of this patent is extended or adjusted under 35 U.S.C. 154(b) by 272 days.

(21) Appl. No.: 17/296,964

(22) PCT Filed: Aug. 9, 2019

(86) PCT No.: PCT/US2019/045852
§ 371 (c)(1),
(2) Date: May 25, 2021

(87) PCT Pub. No.: WO2021/029851
PCT Pub. Date: Feb. 18, 2021

(65) Prior Publication Data
US 2022/0152699 A1    May 19, 2022

(51) Int. Cl.
*B22F 10/14* (2021.01)
*B22F 1/052* (2022.01)
(Continued)

(52) U.S. Cl.
CPC .............. *B22F 10/14* (2021.01); *B22F 1/052* (2022.01); *B22F 1/145* (2022.01); *B22F 1/16* (2022.01);
(Continued)

(58) Field of Classification Search
CPC .......... B22F 10/14; B22F 10/34; B22F 1/052; B22F 1/145; B22F 1/16; B22F 2301/35;
(Continued)

(56) References Cited

U.S. PATENT DOCUMENTS 3,520,676 A * 7/1970 Stahr .................. B22F 1/16
75/348
3,764,295 A    10/1973 Lindskog et al.
(Continued)

FOREIGN PATENT DOCUMENTS

EP        1109159 A1    6/2001
JP     2007057068 A    3/2007
(Continued)

OTHER PUBLICATIONS

Tomsic, Joan L. (editor), Dictionary of Materials and Testing, second ed., 2000, p. 139. (Year: 2000).*
(Continued)

*Primary Examiner* — Vanessa T. Luk
(74) *Attorney, Agent, or Firm* — HP Inc. Patent Department

(57) ABSTRACT

A three-dimensional printing kit can include a binding agent and a particulate build material. The binding agent can include a binder in an aqueous liquid vehicle. The particulate build material can include from about 80 wt % to 100 wt % metal particles that can have a D50 particle size from about 5 μm to about 200 μm. Individual metal particles can include an iron-containing core and can have an oxidation barrier formed thereon. The iron-containing core can include from about 90 wt % to 100 wt % iron. The oxidation barrier can have a stable average thickness from about 0.5% to about 10% of a D50 particle size of the metal particles.

10 Claims, 3 Drawing Sheets

(51) Int. Cl.
*B22F 1/145* (2022.01)
*B22F 1/16* (2022.01)
*B22F 10/34* (2021.01)
*B33Y 10/00* (2015.01)
*B33Y 30/00* (2015.01)
*B33Y 40/10* (2020.01)
*B33Y 40/20* (2020.01)
*B33Y 70/10* (2020.01)

(52) U.S. Cl.
CPC .............. *B22F 10/34* (2021.01); *B33Y 10/00* (2014.12); *B33Y 30/00* (2014.12); *B33Y 40/10* (2020.01); *B33Y 40/20* (2020.01); *B33Y 70/10* (2020.01); *B22F 2301/35* (2013.01); *B22F 2304/10* (2013.01)

(58) Field of Classification Search
CPC ............ B22F 2302/25; B22F 2302/253; B22F 2302/256; C23C 8/14; C23C 8/18
See application file for complete search history.

(56) References Cited

U.S. PATENT DOCUMENTS

| | | |
|---|---|---|
| 4,141,759 A | 2/1979 | Pfistermeister et al. |
| 5,741,372 A | 4/1998 | Gugel |
| 2019/0160531 A1 | 5/2019 | Yoo et al. |
| 2019/0193159 A1 | 6/2019 | Gibson et al. |
| 2019/0344344 A1* | 11/2019 | Shivanath ............... B22F 9/082 |
| 2021/0387259 A1* | 12/2021 | Barnes .................... B22F 1/102 |

FOREIGN PATENT DOCUMENTS

| | | |
|---|---|---|
| WO | 2018/007503 A1 | 1/2018 |
| WO | 2018/075032 A1 | 4/2018 |
| WO | 2019/142727 A1 | 7/2019 |

OTHER PUBLICATIONS

Stephen L. Feldbauer, "Steam Treating; Enhancing the Surface Properties of Metal Components", Abbott Furnace, 2017, 4 pages.

Persson, F., et al., "Oxidation of Water Atomized Metal Powders", Steel Research International., vol. 85, No. 12, Apr. 9, 2014, pp. 1629-1638.

Rishmawi, I, et al., "Tailoring green and sintered density of pure iron parts using binder jetting additive manufacturing", Additive Manufacturing, vol. 24, Oct. 8, 2018, pp. 508-520.

Rishmawi, I., et al., "Binder Jetting Additive Manufacturing of Water-Atomized Iron", Oct. 19, 2018, pp. 160-170.

* cited by examiner

400 ──▶

┌─────────────────────────────────────────────┐
│ iteratively applying individual build material layers of a particulate build material onto a powder bed, the particulate build material including from about 80 wt% to 100 wt% metal particles having an average particle size from about 5 μm to about 200 μm, wherein individual metal particles include an iron-containing core and an oxidation barrier formed thereon, wherein the iron-containing core includes from about 90 wt% to 100 wt% iron, and wherein the oxidation barrier has a stable average thickness from about 0.5% to about 10% of a D50 particle size of the metal particles │
└─────────────────────────────────────────────┘ ─ 410

┌─────────────────────────────────────────────┐
│ based on a 3D object model, iteratively and selectively applying a binding agent to individual build material layers to define individually patterned object layers that become adhered to one another to form a layered green body object │
└─────────────────────────────────────────────┘ ─ 420

FIG. 4

THREE-DIMENSIONAL PRINTING KITS

BACKGROUND

Three-dimensional (3D) printing may be an additive printing process used to make 3D solid parts from a digital model. 3D printing is often used in rapid product prototyping, mold generation, mold master generation, and short run manufacturing. Some 3D printing techniques are considered additive processes because they involve the application of successive layers of material. This is unlike other machining processes, which often rely upon the removal of material to create the final part. Some 3D printing methods use chemical binders or adhesives to bind build materials together. Other 3D printing methods involve partial sintering, melting, etc. of the build material. For some materials, partial melting may be accomplished using heat-assisted extrusion, and for some other materials curing or fusing may be accomplished using, for example, ultra-violet light or infrared light.

BRIEF DESCRIPTION OF THE DRAWINGS

FIG. 4 is a flow diagram illustrating an example method of 3D printing in accordance with the present disclosure.

DETAILED DESCRIPTION

Figure 1:
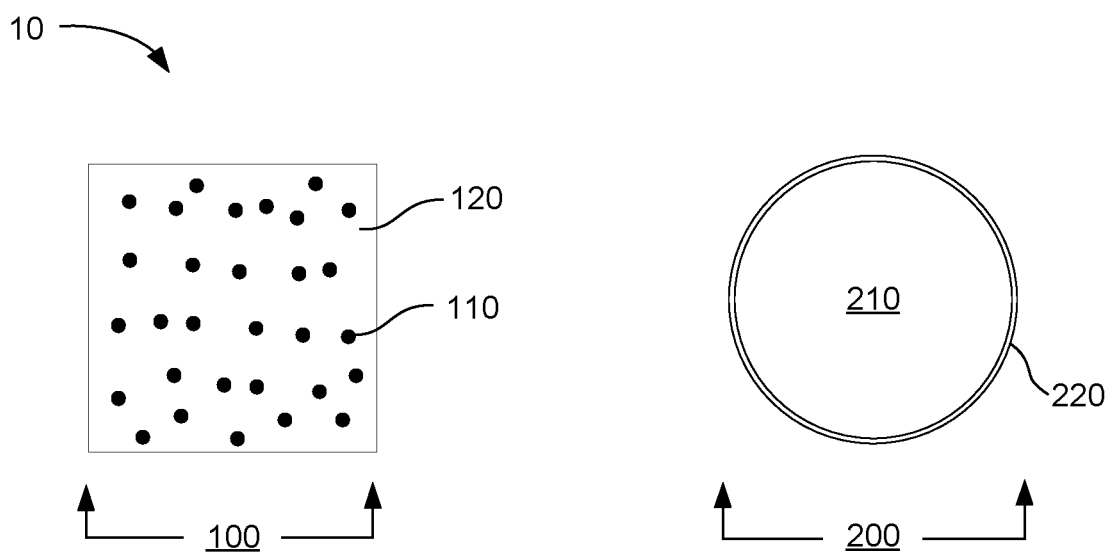
FIG. 1 graphically illustrates an example three-dimensional (3D) printing kit in accordance with the present disclosure.

Three-dimensional (3D) printing can be an additive process that can involve the application of successive layers of particulate build material with chemical binders or adhesives printed thereon to bind the successive layers of the particulate build materials together. In some processes, application of a binding agent with a binder therein can be utilized to form a green body object and then a fused 3D physical object can be formed therefrom. More specifically, binding agent can be selectively applied to a layer of a particulate build material on a support bed to pattern a selected region of the layer of the particulate build material and then another layer of the particulate build material is applied thereon. The binding agent can be applied to another layer of the particulate build material and these processes can be repeated to form a green part (also known as a 3D green body or object), which can then be heat fused to form a sintered 3D object.

In 3D printing with metal particles there can be surface energy variability due to surface contaminants, such as oxides, sub-oxides, and so on. Iron containing metal powders can have a tendency to form iron (III) oxide, e.g. rust, when printed thereon with aqueous binding agents.

$$4Fe+3O_2+2nH_2O=2Fe_2O_3n\ (H_2O)$$

Rust loosely adheres to the iron containing metal and can flake off. As the rust flakes off another portion of the iron containing metal can have rust formed thereon. The rust can flake off again, and this process can repeat. The tendency to form a continually growing layer of rust can occur during both 3D printing and curing and can thereby result in uncontrolled oxidation. As a thickness of the oxidation layer increases, it can impact a hardness and tensile strength of the 3D object created.

In low alloy steel (iron and carbon containing) particulate build materials uncontrolled oxidation can result in carbon loss during sintering making it difficult to maintain carbon content in the printed 3D object.

$$Fe_2O_3+3H_2=2Fe+3H_2O\ (\text{at temperatures}>300°\ C.)$$

$$2Fe_2O_3+3C=4Fe+3CO_2\ (\text{at temperatures}>800°\ C.)$$

$$C+O=CO\ (\text{at temperatures}>950°\ C.)$$

$$CO_2+C=2CO\ (\text{at temperatures}>700°\ C.)$$

$$Fe_2O_3+3CO=2\ Fe+3CO_2\ (\text{at temperatures}>750°\ C.)$$

This loss of carbon during sintering can also reduce the hardness and the tensile strength of 3D objects formed from low alloy steel particulate build materials. Accordingly, uncontrolled oxidation can limit practical uses of iron and iron containing materials such as low alloy steels in 3D printing processes.

In accordance with this, in one example, a three-dimensional printing kit can include a binding agent and a particulate build material. The binding agent can include a binder in an aqueous liquid vehicle. The particulate build material can include from about 80 wt % to 100 wt % metal particles that can have a D50 particle size from about 5 μm to about 200 μm, for example. Individual metal particles can include an iron-containing core and can have an oxidation barrier formed thereon. The iron-containing core can include from about 90 wt % to 100 wt % iron. The oxidation barrier can have a stable average thickness from about 0.5% to about 10% of a D50 particle size of the metal particles. In one example, the iron-containing core can be a low alloy steel and can include from about 90 wt % to about 99.7 wt % iron, from about 0.25 wt % to about 2.1 wt % carbon, and 0 wt % to about 8 wt % of a second metal selected from aluminum, chromium, copper, manganese, molybdenum, niobium, nickel, silicon, titanium, vanadium, zirconium, or a combination thereof. In another example, the iron-containing core can be elemental iron. In yet another example, the metal particles can have a D50 particle size distribution value of from about 10 μm to about 150 μm. In a further example, the oxidation barrier formed thereon can be a $Fe_3O_4$ layer. In one example, the oxidization layer can be structured to resist moisture from reaching the iron-containing core. In another example, the oxidization layer can have an oxygen content of the oxidation barrier that does not increase by more than 1000 ppm when exposed to a relative humidity of greater than 25% at a temperature below 200° C.

In another example, a three-dimensional printing system can include a material set and a fluid applicator. The material set can include a binding agent and a particulate build material. The binding agent can include a binder in an aqueous liquid vehicle. The particulate build material can include from about 80 wt % to 100 wt % metal particles that can have a D50 particle size from about 5 μm to about 200 μm. Individual metal particles can include an iron-containing core and can have an oxidation barrier formed thereon. The iron-containing core can include from about 90 wt % to 100 wt % iron. The oxidation barrier can have a stable average thickness from about 0.5% to about 10% of a D50 particle size of the metal particles. The fluid applicator can be fluidly coupled or coupleable to the binding agent and can be directable to apply the binding agent to the particulate build material to form a layered green body object. In one example, the system can further include a build platform to support a powder bed of particulate build material which can be positionable to receive the binding agent from the fluid applicator onto the particulate build material. In another example, the system can further include a fusing oven to heat the green body object and form a heat-fused three-dimensional object.

Further presented herein, in an example, is a method of three-dimensional printing. The method of three-dimensional printing can include, iteratively applying individual build material layers of a particulate build material onto a powder bed, and based on a 3D object model, iteratively and selectively applying a binding agent to individual build material layers to define individually patterned object layers that can become adhered to one another to form a layered green body object. The particulate build material can include from about 80 wt % to 100 wt % metal particles that can have a D50 particle size from about 5 µm to about 200 µm. Individual metal particles can include an iron-containing core and an oxidation barrier formed thereon. The iron-containing core can include from about 90 wt % to 100 wt % iron. The oxidation barrier can have a stable average thickness from about 0.5% to about 10% of a D50 particle size of the metal particles. In one example, the method can further include steam treating the iron-containing core with a dry steam having from about 0.1 wt % to about 5 wt % moisture content to form the metal particles with the oxidization barrier thereon. In one example, the dry steam can be applied at a temperature from about 300° C. to about 500° C. for a time period from about 5 minutes to about 30 minutes. In another example, the method can further include heating the layered green body object to a temperature from about 600° C. to about 1,500° C. to fuse the metal particles together and form a fused three-dimensional object. In yet another example, the iron-containing core can be a low alloy steel including from about 90 wt % to about 99.7 wt % iron, from about 0.25 wt % to about 2.1 wt % carbon, and 0 wt % to about 8 wt % of a second metal selected from aluminum, chromium, copper, manganese, molybdenum, niobium, nickel, silicon, titanium, vanadium, zirconium, or a combination thereof.

When discussing the three-dimensional (3D) printing kit, the 3D printing system, and/or the method of 3D printing herein, these discussions can be considered applicable to one another whether or not they are explicitly discussed in the context of that example. Thus, for example, when discussing a metal particle related to a 3D printing kit, such disclosure is also relevant to and directly supported in the context of the 3D printing system, the method of 3D printing, and vice versa.

Terms used herein will have the ordinary meaning in the relevant technical field unless specified otherwise. In some instances, there are terms defined more specifically throughout the specification or included at the end of the present specification, and thus, these terms can have a meaning as described herein.

Three-Dimensional Printing Kits

In accordance with examples of the present disclosure, a three-dimensional (3D) printing kit 10 is shown in FIG. 1. The 3D printing kit can include a binding agent 100 and a particulate build material 200. The binding agent can include a binder 110 in an aqueous liquid vehicle 120. The particulate build material can include, by way of example, from about 80 wt % to 100 wt % metal particles that can have a D50 particle size from about 5 µm to about 200 µm. Individual metal particles can include an iron-containing core 210 and an oxidation barrier 220 formed thereon. The iron-containing core can include from about 90 wt % to 100 wt % iron. The oxidation barrier can have a stable average thickness from about 0.5% to about 10% of a D50 particle size of the metal particles. The binding agent, may be packaged or co-packaged with the particulate build material in separate containers, and/or the particulate build material of the 3D printing kit can be generated by steam treating an iron-containing core prior to application of the binding agent.

Binding Agent

In further detail, regarding the binding agent that may be present in the three-dimensional (3D) printing kit, 3D printing system, or utilized in a method of 3D printing as described herein, the binding agent can include an aqueous liquid vehicle and binder, e.g., latex particles, to bind the particulate build material together during the build process to form a 3D green body object. The term "binder" can include material used to physically bind separate metal particles together or facilitate adhesion to a surface of adjacent metal particles to a green part or 3D green body object in preparation for subsequent fusing, sintering, or annealing. During 3D printing, a binding agent can be applied to the particulate build material on a layer by layer basis and can move into vacant spaces between particles of the particulate build material. The binding agent can provide binding to the particulate build material upon application, or in some instances, can be further treated after printing to provide binding properties, e.g., exposure to IR energy to evaporate volatile species, exposure to flash heating (photo energy and heat) to activate a reducing agent, exposure to UV or IR energy to initiate polymerization, and the like.

A "green" part or 3D green body object (or individual layer) can refer to any component or mixture of components that are not yet sintered or annealed. Once the green part or 3D green body object is sintered or annealed, the part or body object can be referred to as a "brown" object, "brown" part, or 3D printed object or part. "Sintering" refers to the consolidation and physical bonding of the metal particles together (after temporary binding using the binding agent) by solid state diffusion bonding, partial melting of metal particles, or a combination of solid state diffusion bonding and partial melting. The term "anneal" refers to a heating and cooling sequence that controls the heating process and the cooling process, e.g., slowing cooling in some instances to remove internal stresses and/or toughen the sintered part or object (or "brown" part) prepared in accordance with examples of the present disclosure.

In one example, the binder can be a polymer binder or a polymerizable binder. In one example, the polymer binder or polymerizable binder can be present at from about 2 wt % to about 50 wt %, from about 10 wt % to about 25 wt %, from about 3 wt % to about 20 wt %, from about 5 wt % to about 15 wt %, from about 25 wt % to about 50 wt %, from about 20 wt % to about 40 wt %, or from about 5 wt % to about 20 wt % in the binding agent.

In some examples, the polymer binder or polymerizable binder can include latex particles. The latex particles can have a D50 particle size that can range from about 10 µm to about 250 µm and can be dispersed in the aqueous liquid vehicle. The latex particles can include polymerized monomers of vinyl, vinyl chloride, vinylidene chloride, vinyl ester, functional vinyl monomers, acrylate, acrylic, acrylic acid, hydroxyethyl acrylate, methacrylate, methacrylic acid, styrene, substituted methyl styrenes, ethylene, maleate esters, fumarate esters, itaconate esters, α-methyl styrene, p-methyl styrene, methyl (meth)acrylate, hexyl acrylate, hexyl (meth)acrylate, butyl acrylate, butyl (meth)acrylate, ethyl acrylate, ethyl (meth)acrylate, propyl acrylate, propyl (meth)acrylate, 2-ethylhexyl acrylate, 2-ethylhexyl (meth)

acrylate, isodecyl (meth) acrylate, octadecyl acrylate, octadecyl (meth)acrylate, stearyl (meth)acrylate, vinylbenzyl chloride, isobornyl acrylate, isobornyl (meth)acrylate, tetrahydrofurfuryl acrylate, tetrahydrofurfuryl (meth)acrylate, 2-phenoxyethyl (meth)acrylate, benzyl (meth)acrylate, benzyl acrylate, ethoxylated nonyl phenol (meth)acrylate, isobornyl (meth)acrylate, cyclohexyl (meth)acrylate, trimethyl cyclohexyl (meth)acrylate, t-butyl (meth)acrylate, n-octyl (meth)acrylate, lauryl (meth)acrylate, tridecyl (meth)acrylate, alkoxylated tetrahydrofurfuryl acrylate, alkoxylated tetrahydrofurfuryl (meth)acrylate, isodecyl acrylate, isobornyl methacrylate, isobornyl acrylate, dimethyl maleate, dioctyl maleate, acetoacetoxyethyl (meth) acrylate, diacetone acrylamide, diacetone (meth)acrylamide, N-vinyl imidazole, N-vinylcarbazole, N-vinyl-caprolactam, combinations thereof, derivatives thereof, or mixtures thereof.

In other examples, the latex particles can include acidic monomers that can be polymerized such as acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, sodium 1-allyloxy-2-hydroxypropane sulfonate, combinations thereof, derivatives thereof, or mixtures thereof.

In some examples, the latex particles can include an acrylic. In other examples, the latex particles can include 2-phenoxyethyl methacrylate, cyclohexyl methacrylate, cyclohexyl acrylate, methacrylic acid, combinations thereof, derivatives thereof, or mixtures thereof. In another example, the latex particles can include styrene, methyl methacrylate, butyl acrylate, methacrylic acid, combinations thereof, derivatives thereof, or mixtures thereof.

The binder can be dispersed in an aqueous liquid vehicle suitable for jetting. In one example, the aqueous liquid vehicle, can include water as a major solvent, e.g., the solvent present at the highest concentration when compared to other co-solvents. The aqueous liquid vehicle can be present in the binding agent at from about 20 wt % to about 98 wt %, from about 70 wt % to about 98 wt %, from about 50 wt % to about 90 wt %, or from about 25 wt % to about 75 wt %.

Apart from water, the aqueous liquid vehicle can further include from about 0.1 wt % to about 50 wt % of other liquid components. The other liquid components can include organic co-solvents, co-polymerizable surfactants, additives that inhibit growth of harmful microorganisms, viscosity modifiers, pH adjusters, sequestering agents, surfactants, preservatives, etc.

When present, organic co-solvent(s) can include high-boiling solvents and/or humectants, e.g., aliphatic alcohols, aromatic alcohols, alkyl diols, glycol ethers, polyglycol ethers, 2-pyrrolidinones, caprolactams, formamides, acetamides, long chain alcohols, or mixtures thereof. The organic co-solvent(s) in aggregate can comprise from 0 wt % to about 50 wt % of the binding agent. In other examples, organic co-solvents can be present at from about 5 wt % to about 25 wt %, from about 2 wt % to about 20 wt %, or from about 10 wt % to about 30 wt % of the binding agent.

When present, the co-polymerizable surfactant can include polyoxyethylene alkylphenyl ether ammonium sulfate, sodium polyoxyethylene alkylether sulfuric ester, polyoxyethylene styrenated phenyl ether ammonium sulfate; or mixtures thereof Some example additives that can inhibit the growth of harmful microorganisms can include biocides, fungicides, and other microbial agents. Commercially available examples can include ACTICIDE® (Thor Specialties, Inc., U.S.A.), NUOSEPT® (Troy, Corp. U.S.A), UCARCIDE™ (The Dow Chemical Company, U.S.A.), VANCIDE® (Vanderbilt Chemicals, LLC, U.S.A.), PROXEL® (Lonza America, Inc., U.S.A.), and combinations thereof.

In some examples, the binding agent can have a pH that can range from about 6 to about 10. In yet other examples, the binding agent can have a pH that can range from about 6.5 to about 9, from about 6.5 to about 8, from about 6.6 to about 8, from about 6.8 to about 8, from about 7 to about 9, or from about 7 to about 8. A pH adjustor can be added to the aqueous liquid vehicle in order to adjust the pH to a pH ranging from about 6.5 to about 9.

When applied to a layer of the particulate build material, the aqueous liquid vehicle can be capable of wetting the particulate build material and the binder can be capable of penetrating into microscopic pores of the layer (e.g. the spaces between the metal particles of the particulate build material). The binder can be activated or cured by heating the binder, (which may be accomplished by heating an entire layer of the particulate build material on at least a portion of which the binding agent has been selectively applied) to about the glass transition temperature of the polymer binder or polymerizable binder. When activated or cured, the binding agent can form an at least substantially continuous network gluing the metal particles of the particulate build material together and can form a 3D green body object or a printed layer of the 3D green body object. The 3D green body object can have the mechanical strength to withstand extraction from a powder bed and can be sintered or annealed to form a 3D printed object. In some examples, the binder contained in the binding agent can undergo a pyrolysis or burnout process where the binder may be removed during sintering or annealing. This can occur where the thermal energy applied to a 3D green body part or object removes inorganic or organic volatiles and/or other materials that may be present either by decomposition or by burning the binding agent.

Particulate Build Material

The particulate build material can include from about 80 wt % to 100 wt % metal particles based on a total weight of the particulate build material. In other examples, the powder bed material can include from about 90 wt % to 100 wt % metal particles, from about 99 wt % to 100 wt % metal particles, or can consist of the metal particles, e.g., 100 wt % metal particles. The metal particles can include an iron-containing core with an oxidation barrier formed thereon.

The iron-containing core can include from about 90 wt % to 100 wt % iron. In yet other examples, the iron-containing core can include from about 90 wt % to about 95 wt % iron, from about 92 wt % to about 98 wt %, from about 95 wt % to 100 wt %, or from about 93 wt % to about 96 wt % iron. In one example, the iron-containing core can be elemental iron. In some examples, the iron-containing core can further include carbon, aluminum, manganese, niobium, chromium, nickel, copper, molybdenum, vanadium, tungsten, titanium, zinc, silicon, zirconium, or any admixtures of these materials. These materials can be present at from 0 wt % to about 10 wt %, from about 0.1 wt % to about 5 wt %, or from about 0.5 wt % to about 3.5 wt % in the iron-containing core. In one example, the iron-containing core can be a low alloy steel. In one example, the low alloy steel can include from about 90 wt % to about 99.7 wt % iron, from about 0.25 wt % to about 2.1 wt % carbon, and from 0 wt % to about 8 wt % of a second metal selected from aluminum, chromium, copper, manganese, molybdenum niobium, nickel, silicon, titanium, vanadium, zirconium, or a combination thereof.

The iron containing core can have a D50 particle size distribution value of from about 4.95 µm to about 199.95 µm, having a total D50 particle size (including the oxidation layer) of about 5 µm to about 200 µm. In yet other examples, the iron containing core can have a D50 particle size distribution value of from about 4.95 µm to about 50 µm, from about 10 µm to about 150 µm, from about 4.95 µm to about 15 µm, from about 4.95 µm to about 25 µm, or from about 50 µm to about 150 µm.

As used herein, particle size can refer to a value of the diameter of spherical particles or in particles that are not spherical can refer to the equivalent spherical diameter of that particle. The particle size can be presented as a Gaussian distribution or a Gaussian-like distribution (or normal or normal-like distribution). Gaussian-like distributions are distribution curves that can appear Gaussian in distribution curve shape, but which can be slightly skewed in one direction or the other (toward the smaller end or toward the larger end of the particle size distribution range). That being stated, an example Gaussian-like distribution of the metal particles can be characterized generally using "D10," "D50," and "D90" particle size distribution values, where D10 refers to the particle size at the $10^{th}$ percentile, D50 refers to the particle size at the $50^{th}$ percentile, and D90 refers to the particle size at the $90^{th}$ percentile. For example, a D50 value of about 25 µm means that about 50% of the particles (by number) have a particle size greater than about 25 µm and about 50% of the particles have a particle size less than about 25 µm. Particle size distribution values are not necessarily related to Gaussian distribution curves. In practice, true Gaussian distributions are not typically present, as some skewing can be present, but still, the Gaussian-like distribution can be considered to be "Gaussian" as used in practice. Particle size distribution here is typically expressed in terms of D50 particle size, which can approximate average particle size, but may not be the same. In examples herein, the particle size ranges herein can modified to "average particle size," providing sometimes slightly different size distribution ranges.

The iron-containing core can have an oxidation barrier formed thereon. The oxidation barrier can have a stable average thickness that can range from about 0.5% to about 10% of the D50 particle size of the metal particles. In yet other examples, the oxidation barrier can have a stable average thickness that can range from about 1% to about 5%, from about 2% to about 8%, or from about 1.5% to about 4.5% of the D50 particle size of the metal particles. As used herein, "stable average thickness" indicates that the oxidation barrier does not grow in thickness more than about 1% when exposed to air having a humidity of about 25% at a temperature of about 200° C. for a time period of about 24 hours. Lower humidity levels and/or lower temperatures would also not cause the oxidation barrier to grow more than 1% in thickness, and thus, the 25% humidity and 200° C. temperature is used to define the outer limits of determining whether the oxidation barrier has a "stable average thickness." In some more specific examples, an oxygen content of the oxidization barrier may not increase by more than 1000 ppm when exposed to a relative humidity of 25% at a temperature 200° C.

In some examples, the oxidation barrier can have a uniformity of thickness of from about 0.025 µm to about 20 µm. In other examples, the oxidation barrier can have a uniformity of thickness of from about 0.1 µm to about 10 µm, from about 5 µm to about 15 µm, or from about 1 µm to about 20 µm. As used herein, a "uniformity of thickness" indicates that from about 80% to 100% of the iron-containing core can be covered in an oxidation barrier.

In some examples, the oxidation barrier can be structured to resist moisture from reaching the iron-containing core, e.g. the oxidation barrier can be impervious to moisture. In some examples, the oxidation barrier can be an adherent layer. As used herein, an "adherent layer" indicates that the oxidation barrier can be physically, chemically, or physically and chemically bonded to the iron-containing core. In some examples, the oxidation barrier can be uniform, impervious, and adherent and can thereby prevent moisture from reaching the iron-containing core.

The oxidation barrier can include a $Fe_3O_4$ layer, a FeO layer, or a combination thereof. In one example, the oxidation barrier can include $Fe_3O_4$. $Fe_3O_4$ can be an adhering oxide layer and can thereby protect the iron-containing core from further oxidation.

The shape of the metal particles can be spherical, irregular spherical, rounded, semi-rounded, discoidal, angular, subangular, cubic, cylindrical, or any combination thereof. In one example, the metal particles can include spherical particles, irregular spherical particles, or rounded particles. In some examples, the shape of the metal particles can be uniform or substantially uniform, which can allow for relatively uniform melting or sintering of the particulates after the 3D green part can be formed and then heat fused in a sintering or annealing oven, for example.

Three-Dimensional Printing Systems

Figure 2:
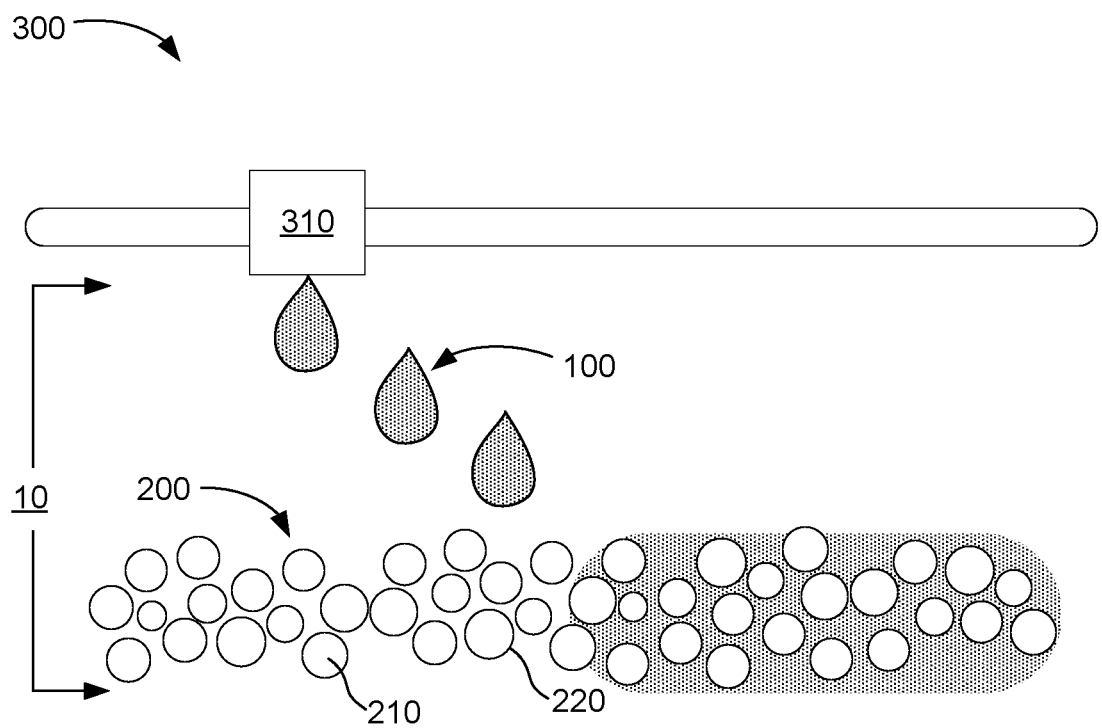
FIG. 2 graphically illustrates a 3D printing system in accordance with the present disclosure.

A three-dimensional (3D) printing system 300 is also shown in FIG. 2, and can include a three-dimensional printing kit 10 and a fluid applicator 310. The three-dimensional printing kit can include a binding agent 100 and a particulate build material 200, as describe in FIG. 1, for example. The binding agent can include a binder in an aqueous liquid vehicle, and the particulate build material can include metal particles with an iron-containing core 210 and a oxidation barrier 220 formed thereon. By way of example, the particulate build material can include from about 80 wt % to 100 wt % metal particles that can have a D50 particle size from about 5 µm to about 200 µm. Individual metal particles can include an iron-containing core 210 and an oxidation barrier 220 formed thereon. The iron-containing core can include from about 90 wt % to 100 wt % iron. The oxidation barrier can have a stable average thickness from about 0.5% to about 10% of a D50 particle size of the metal particles. As illustrated in FIG. 2, the fluid applicator can be fluidly coupled or coupleable to the binding agent and directable to apply the binding agent to the particulate build material to form a layered green body object. The binding agent and particulate build material of the material set can be as described above with respect to the 3D printing kit.

The fluid applicator 310 can be any type of printing apparatus capable of selectively applying the binding agent. For example, the fluid applicator can be an inkjet printhead, a piezo-electric printhead, a thermal printhead, a continuous printhead, a sprayer, a dropper, or a combination thereof. Thus, in some examples, the application can be by jetting or ejecting from a digital fluidjet applicator, similar to an inkjet pen. In some examples, the fluid applicator can include a motor and can be operable to move back and forth over the particulate build material when positioned in a powder bed of a build platform.

Figure 3:
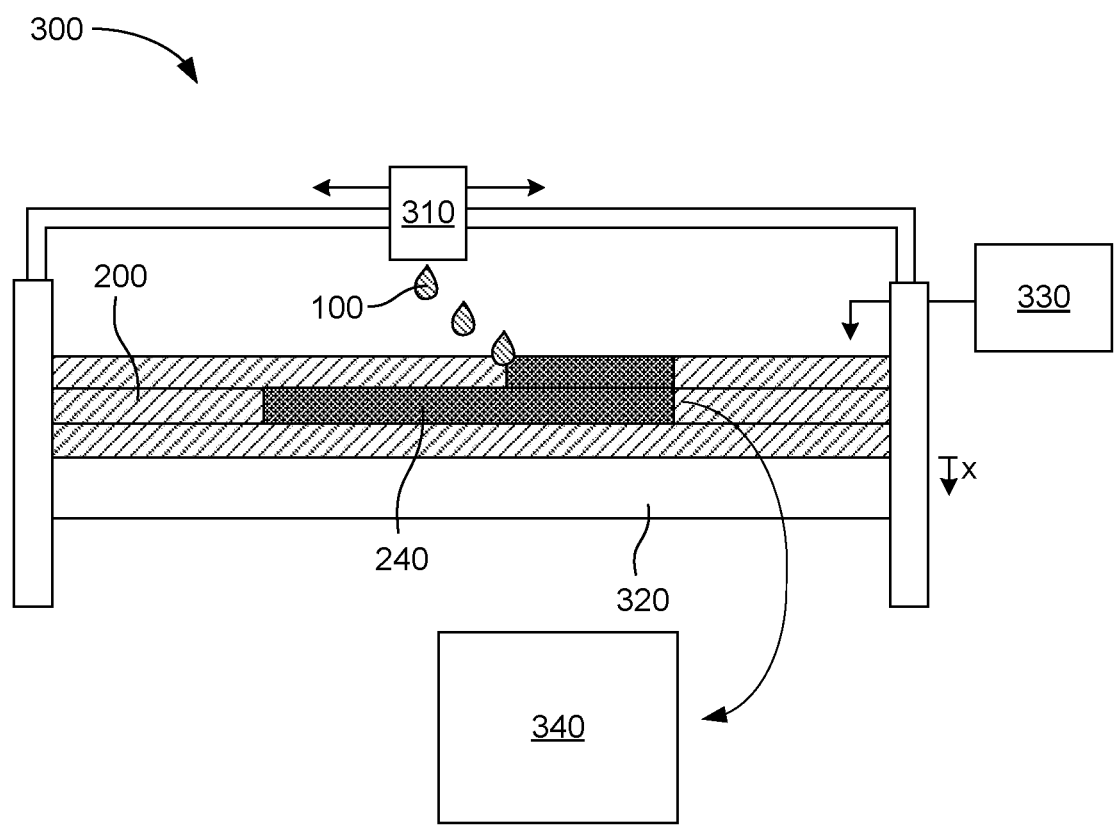
FIG. 3 graphically illustrates a 3D printing system in accordance with the present disclosure.

In some examples, as further illustrate din FIG. 3, in addition to the fluid applicator 310, the system 300 can further include a build platform 320 that can support a powder bed of particulate build material 200. The build platform can be positionable to receive the binding agent 100 from the fluid applicator onto the particulate build material. The build platform can be configured to drop in height (shown at "x"), thus allowing for successive layers of particulate build material to be applied by a spreader 330. The particulate build material can be layered in the build platform at a thickness that can range from about 5 μm to about 1 cm. In some examples, individual layers can have a relatively uniform thickness. In one example, a thickness of a layer of the particulate build material can range from about 10 μm to about 500 μm. In another example, a thickness of a layer of the particulate build material can range from about 500 μm to about 1 cm. In further detail, the 3D printing system can further include a fusing oven 340 to heat the green body object 240 (formed from the particulate build material with binding agent applied thereto) and to form a heat-fused 3D object.

Three-Dimensional Printing Methods

A flow diagram of an example method of three-dimensional (3D) printing 400 is shown in FIG. 4. The method can include iteratively applying 410 individual build material layers of a particulate build material onto a powder bed. The particulate build material can include from about 80 wt % to 100 wt % metal particles that can have a D50 particle size from about 5 μm to about 200 μm. Individual metal particles can include an iron-containing core with an oxidation barrier formed thereon. The iron-containing core can include from about 90 wt % to 100 wt % iron. The oxidation barrier can have a stable average thickness from about 0.5% to about 10% of a D50 particle size of the metal particles. The method can further include, based on a 3D object model, iteratively and selectively applying 420 a binding agent to individual build material layers to define individually patterned object layers that can become adhered to one another to form a layered green body object.

After an individual particulate build material layer is printed with a binding agent, in some instances the individual build material layer can be heated to drive off water and/or other liquid vehicle components and to further solidify the layer of the 3D green body object. The build platform can be dropped a distance of (x), which can correspond to the thickness of a printed layer of the 3D green body object, so that another layer of the particulate build material can be added thereon, printed with binding agent, solidified, etc. The process can be repeated on a layer by layer basis until the entire 3D green body object is formed and stable enough to move to an oven suitable for fusing, e.g., sintering, annealing, melting, or the like.

In one example, the method can further include treating an iron-containing core with a dry steam having from about 0.1 wt % to about 5 wt % moisture content to form the oxidation barrier on the iron-containing core of the metal particles. In some examples, the dry steam can be applied at a temperature ranging from about 300° C. to about 500° C. for a time period that can range from about 5 minutes to about 30 minutes. In yet other examples, the dry steam can be applied at a temperature ranging from about 350° C. to about 450° C. for a time period that can range from 5 minutes to about 15 minutes. Excess moisture content will oxidize and stabilize the Fe2O3 oxide on the surface through the hydroxyl reaction negating the desired effect of forming an oxidation barrier via steam treatment.

In some examples, heat can be applied to the individual build material layers (or group of layers) with a binding agent printed thereon to drive off water and/or other liquid vehicle components from the binding agent and to further solidify the individual build material layers of the 3D green body object. In one example, heat can be applied from overhead and/or can be provided by the build platform from beneath the particulate build material. In some examples, the particulate build material can be heated prior to dispensing. Further, heating can occur upon application of the binding agent to the individual build material layers or following application of the printed binding agent. The temperature(s) at which the metal particles of the particulate build material fuse together can be above the temperature of the environment in which the patterning portion of the 3D printing method is performed, e.g., patterning at from about 18° C. to about 300° C. and fusing at from about 600° C. to about 1,500° C. In some examples, the metal particles of the particulate build material can have a melting point ranging from about 600° C. to about 1,500° C.

Following the formation of the 3D green body object, the entire 3D green body object can be moved to an oven and heated to a temperature ranging from about 600° C. to about 1,500° C. to fuse the metal particles together and to form a sintered 3D object. In some examples, the temperature can range from about 600° C. to about 1,200° C., from about 800° C. to about 1,200° C., or from about 750° C. to about 1,500° C. Depending on the metal particles, these temperature ranges can be used to melt an outer layer of the metal particles and can permit sintering of the metal particles to one another, while not melting an inner portion of the metal particles, in one example.

The eventual sintering temperature range can vary, depending on the particle size, but in one example, the sintering temperature can range from about 10° C. below the melting temperature of the metal particles of the particulate build material to about 50° C. below the melting temperature of the metal particles of the particulate build material. The sintering temperature can also depend upon a period of time that heating occurs, e.g., at a high temperature for a sufficient time to cause particle surfaces to become physically merged or composited together). The sintering temperature can sinter and/or otherwise fuse the metal particles to form the sintered 3D object.

Definitions

It is noted that, as used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 10%, or, in one aspect within 5%, of a stated value or of a stated limit of a range. The term "about" when modifying a numerical range is also understood to include as one numerical subrange a range defined by the exact numerical value indicated, e.g., the range of about 1 wt % to about 5 wt % includes 1 wt % to 5 wt % as an explicitly supported sub-range.

As used herein, the "green" is used to described any of a number of intermediate structures prior to any particle to particle material fusing, e.g., green part, green body, green body object, green body layer, etc. As a "green" structure, the particulate build material can be (weakly) bound together by a binder. Typically, a mechanical strength of the green body is such that the green body can be handled or extracted from a particulate build material on build platform to place in a fusing oven, for example. It is to be understood that any particulate build material that is not patterned with the binding agent is not considered to be part of the "green" structure, even if the particulate build material is adjacent to or surrounds the green body object or layer thereof. For example, unprinted particulate build material can act to support the green body while contained therein, but the particulate build material is not part of the green structure unless the particulate build material is printed with a binding agent or some other fluid that is used to generate a solidified part prior to fusing, e.g., sintering, annealing, melting, etc.

As used herein, the terms "3D part," "3D object," or the like, refer to the target 3D object that is being built. The 3D object can be referred to as a "fused" or "sintered" 3D object, indicating that the object has been fused such as by sintering, annealing, melting, etc., or a "green body" or "green" 3D object, indicating the object has been solidified, but not fused.

The term "fluid" does not infer that a composition is free of particulate solids, but rather, can include solids dispersed therein, including carbon black pigment, latex particles, or other solids that are dispersed in the liquid vehicle of the fluid. Fluids can be referred to herein as "agents," for example, such as a binding agent that includes a liquid vehicle and binder contained therein, often as a dispersion.

As used herein, "kit" can be synonymous with and understood to include a plurality of compositions including multiple components where the different compositions can be separately contained in the same or multiple containers prior to and during use, e.g., building a 3D object, but these components can be combined together during a build process. The containers can be any type of a vessel, box, or receptacle made of any material. Alternatively, a kit may be generated during the process of 3D building a portion at a time. For example, the particulate build material can be steam treated at a time to form a "kit", just prior to being printed thereon with the binding agent.

The term "fuse," "fusing," "fusion," or the like refers to the joining of the material of adjacent particles of a particulate build material, such as by sintering, annealing, melting, or the like, and can include a complete fusing of adjacent particles into a common structure, e.g., melting together, or can include surface fusing where particles are not fully melted to a point of liquefaction, but which allow for individual particles of the particulate build material to become bound to one another, e.g., forming material bridges between particles at or near a point of contact.

As used herein, "applying" when referring to binding agent or other fluid agents that may be used, for example, refers to any technology that can be used to put or place the fluid agent, e.g., binding agent, on the particulate build material or into a layer of particulate build material for forming a 3D green body object. For example, "applying" may refer to "jetting," "ejecting," "dropping," "spraying," or the like.

As used herein, "jetting" or "ejecting" refers to fluid agents or other compositions that are expelled from ejection or jetting architecture, such as ink-jet architecture. Ink-jet architecture can include thermal or piezoelectric architecture. Additionally, such architecture can be configured to print varying drop sizes such as from about 3 picoliters to less than about 10 picoliters, or to less than about 20 picoliters, or to less than about 30 picoliters, or to less than about 50 picoliters, etc.

As used herein, a plurality of items, structural elements, compositional elements, and/or materials may be presented in a common list for convenience. However, these lists should be construed as though the individual member of the list is identified as a separate and unique member. Thus, no individual member of such list should be construed as a de facto equivalent of any other member of the same list based on presentation in a common group without indications to the contrary.

Concentrations, dimensions, amounts, and other numerical data may be presented herein in a range format. It is to be understood that such range format is used merely for convenience and brevity and should be interpreted flexibly to include the numerical values explicitly recited as the limits of the range, as well as to include all the individual numerical values or sub-ranges encompassed within that range as the individual numerical value and/or sub-range is explicitly recited. For example, a weight ratio range of about 1 wt % to about 20 wt % should be interpreted to include the explicitly recited limits of 1 wt % and 20 wt % and to include individual weights such as about 2 wt %, about 11 wt %, about 14 wt %, and sub-ranges such as about 10 wt % to about 20 wt %, about 5 wt % to about 15 wt %, etc.

What is claimed is:

1. A method of three-dimensional printing, comprising:
   iteratively applying individual build material layers of a particulate build material onto a powder bed, the particulate, build material consisting of metal particles having a D50 particle size of from about 5 µm to about 200 µm, wherein individual metal particles consist of an iron-containing core having an oxidation barrier formed thereon, wherein the iron-containing core includes from about 90 wt % to 100 wt % of iron, and wherein the oxidation barrier has a thickness ranging from about 5 µm to about 20 µm; and
   based on a 3D object model, iteratively and selectively applying a binding agent to individual build material layers to define individually patterned object layers that become adhered to one another to form a layered green body object.

2. The method of claim 1, wherein the iron-containing core is elemental iron.

3. The method of claim 1, wherein the D50 particle size of the metal particles ranges from about 10 µm to about 150 µm.

4. The method of claim 1, wherein the oxidation barrier is a $Fe_3O_4$ layer.

5. The method of claim 1, wherein the oxidization barrier is structured to resist moisture from reaching the iron-containing core.

6. The method of claim 1, wherein an oxygen content of the oxidization barrier does not increase by more than 1000 ppm when exposed to a relative humidity of 25% at a temperature of 200° C.

7. The method of claim 1, further comprising steam treating the iron-containing core with a dry steam having from about 0.1 wt % to about 5 wt % moisture content to form the metal particles with the oxidization barrier thereon.

8. The method of claim 7, wherein the dry steam is applied at a temperature of from about 300° C. to about 500° C. for a time period of from about 5 minutes to about 30 minutes.

9. The method of claim 1, further comprising heating the layered green body object to a temperature of from about 600° C. to about 1,500° C. to fuse the metal particles together and form a fused three-dimensional object.

10. The method of claim 1, wherein the iron-containing core is a low alloy steel including from about 90 wt % to about 99.7 wt % of iron, from about 0.25 wt % to about 2.1 wt % of carbon, and from 0 wt % to about 8 wt % of a second metal selected from the group consisting of aluminum, chromium, copper, manganese, molybdenum, niobium, nickel, silicon, titanium, vanadium, zirconium, and a combination thereof.

* * * * *